Patented July 24, 1928.

1,677,964

UNITED STATES PATENT OFFICE.

ERNEST FOURNEAU, OF PARIS, FRANCE, ASSIGNOR TO LES ETABLISSEMENTS POULENC FRERES, A CORPORATION OF FRANCE.

SALTS OF 3-ACETYLAMINO-4-HYDROXYPHENYL ARSENIC ACID AND METHOD OF PREPARING THE SAME.

No Drawing. Application filed January 18, 1927, Serial No. 161,967, and in France January 19, 1926.

Oxyacetylaminoarsenic acid yields crystalline salts with the alkali metals, but these salts are relatively feebly soluble in water (1 part in 8 to 1 part in 10 on the average). The preparation of salts of the acid with amines and especially with diethylamine has been described in British Patent No. 224,764, Jan. 22, 1924, and U. S. Patent No. 1,532,361, July 4, 1925. These amine salts are crystalline and very soluble.

The present invention relates to the preparation of other readily soluble salts of this acid and aims to provide a simple inexpensive procedure starting from materials less costly than those used in preparing the amine salts.

An illustrative procedure is the following. Dissolve 3-acetylamino-4-hydroxyphenylarsenic acid in the calculated quantity of 5 N ammonia and add a sufficient excess of ammonia to yield a solution perfectly neutral to tournesol. The salt is precipitated by adding 2 volumes of alcohol and recrystallized from alcohol at 60°. The salt contains one molecule of water of crystallization.

It has the following formula:

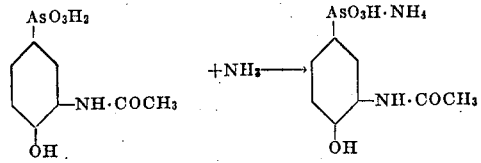

The salt thus obtained is extremely soluble in water and may be prepared in solutions of any desired concentration.

*Preparation of solutions.*—One gram of the ammonium salt is dissolved in the quantity water necessary to yield the desired concentration (generally 2 to 4 c. c.). A solution of sodium sulphite ($SO_3Na_2$) containing about 2 gm. of sulphite to 4 c. c. of water is prepared separately and a drop of this solution is added to the solution of the ammonium salt.

Ampules prepared by the foregoing procedure are perfectly colorless and may be sterilized without deterioration.

Having now described and ascertained the nature of my said invention and in what manner the same is to be performed, I declare that what I claim is:

1. A composition of matter containing the ammonium salt of acetylamino-phenylarsenic acid.

2. In a method of preparing solutions of organic arsenicals, the steps comprising dissolving hydroxy-acetylamino-phenylarsenic acid in ammonia crystallizing the salt thus formed and dissolving the ammonium salt of the acid in water.

3. In the method of preparing solutions of organic arsenicals, the steps comprising dissolving hydroxy-acetylamino-phenylarsenic acid in ammonia and crystallizing the salt thus formed.

4. In the method of preparing solutions of organic arsenicals, the steps comprising dissolving hydroxy-acetylamino-phenylarsenic acid in aqueous ammonia and precipitating the salt with alcohol.

5. In the method of preparing solutions of organic arsenicals, the steps comprising dissolving hydroxy-acetylamino-phenylarsenic acid in aqueous ammonia, adjusting the alkalinity of the solution to approximate neutrality, precipitating the salt with alcohol, and recrystallizing from alcohol.

6. In the method of preparing solutions of organic arsenicals, the steps comprising dissolving hydroxy-acetylamino-phenylarsenic acid in aqueous ammonia, adjusting the alkalinity of the solution so that it is neutral to tournesol, precipitating the salt with alcohol, and recrystallizing from alcohol.

In testimony whereof I affix my signature.

ERNEST FOURNEAU.